(12) United States Patent
Osypov et al.

(10) Patent No.: US 8,417,497 B2
(45) Date of Patent: Apr. 9, 2013

(54) UPDATING A MODEL OF A SUBTERRANEAN STRUCTURE USING DECOMPOSITION

(75) Inventors: Konstantin S. Osypov, Houston, TX (US); David Nichols, Houston, TX (US); Can Evren Yarman, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 798 days.

(21) Appl. No.: 12/354,548

(22) Filed: Jan. 15, 2009

(65) Prior Publication Data

US 2009/0184958 A1    Jul. 23, 2009

Related U.S. Application Data

(60) Provisional application No. 61/011,607, filed on Jan. 18, 2008.

(51) Int. Cl.
    G06G 7/48 (2006.01)
(52) U.S. Cl. .......................... 703/10; 702/11
(58) Field of Classification Search ............. 703/5, 10; 702/6, 7, 8, 11, 12, 18; 708/520; 367/73
    See application file for complete search history.

(56) References Cited

U.S. PATENT DOCUMENTS

| | | | |
|---|---|---|---|
| 4,972,383 A | 11/1990 | Lailly | |
| 5,854,991 A | 12/1998 | Gupta et al. | |
| 6,549,854 B1 | 4/2003 | Malinverno et al. | |
| 6,736,221 B2 | 5/2004 | Chia et al. | |
| 6,748,330 B2 | 6/2004 | Leaney | |
| 6,834,732 B2 | 12/2004 | Haarstad | |
| 7,366,616 B2 | 4/2008 | Bennett et al. | |
| 2007/0118346 A1* | 5/2007 | Wen et al. ........................ 703/10 |
| 2007/0168133 A1* | 7/2007 | Bennett et al. .................... 702/6 |
| 2007/0255779 A1* | 11/2007 | Watts, III ...................... 708/520 |
| 2007/0271039 A1* | 11/2007 | Ella et al. ........................ 702/12 |
| 2008/0033656 A1* | 2/2008 | Herwanger .................... 702/18 |
| 2008/0140369 A1* | 6/2008 | Rashid et al. .................. 703/10 |
| 2008/0162099 A1* | 7/2008 | Vega Velasquez .............. 703/10 |
| 2008/0273421 A1 | 11/2008 | Koren et al. | |
| 2008/0312838 A1* | 12/2008 | Cavalca et al. ................. 702/11 |
| 2009/0005993 A1* | 1/2009 | Abubakar et al. ................ 702/7 |
| 2009/0082970 A1* | 3/2009 | Andreis et al. ................... 702/8 |
| 2009/0254320 A1* | 10/2009 | Lovatini et al. .................. 703/5 |
| 2009/0303834 A1* | 12/2009 | Sengupta et al. ............... 367/73 |
| 2010/0332139 A1 | 12/2010 | Bruun et al. | |

FOREIGN PATENT DOCUMENTS

WO    9700485 A1    1/1997

OTHER PUBLICATIONS

Kalyuzhny et al., "Method of the principal informative components for reconstructing problem", IEEE 2000.*
Zhou et al., "Characterization of electromagnetic systems using Pade Approximation with expansion at infinity", IEEE 2000.*
Chen et al., "Fast eigenspace decomposition of correlated images", IEEE 1998.*

(Continued)

*Primary Examiner* — Kandasamy Thangavelu (57) ABSTRACT

To update a model of a subterranean structure, a partial decomposition is computed of an operator that is used to compute a parameterization representing the update of the model. The partial decomposition of the operator is selected from among a partial eigendecomposition of a Fisher information operator, and a singular value decomposition of the operator. A term based on additional information is combined with the partial decomposition of the operator to derive an update of the model.

22 Claims, 2 Drawing Sheets

OTHER PUBLICATIONS

Yendiki et al., "Analysis of obeserver performance in known-location tasks for tomographic image reconstruction", IEEEW 2006.*

Christof Stork, Reflection Tomography in the Postmigrated Domain, Geophysics, May 1992, pp. 680-692, vol. 57, No. 5.

Bennett, N. and A. Malinverno, 2004. Fast Model Updates using Wavelets, SIAM Multiscale Modeling and Simulation, 3, 106-138.

Lanczos, C., 1950. An Iteration Method for the Solution of the Eigenvalue Problem of Linear differential and Integral Operators, J. Res. Natl. Bur. Stand. 45, 255-282.

Woodward, M. J., P. Farmer, D. Nichols, and S. Charles, 1998. Automated 3-D tomographic velocity analysis of residual moveout in prestack depth migrated common image point gathers, SEG, Expanded Abstracts, 1218-1221.

Yao, Z. S., Osypov, K. S., Roberts, R. G., 1998. Traveltime tomography using regularized recursive least squares, Geophys. J. Int., 134, 545-553.

Ursin, et al., Identification of Seismic Reflections using Singular Value Decomposition, Modeling Identification and Control, 1986, pp. 1-23, vol. 7, No. 1.

PCT Search Report, dated Jun. 5, 2009, for Application No. PCT/US2009/031375 filed Jan. 19, 2009.

Stork et al., "Linear aspects of tomographic velocity analysis," Geophysics, Apr. 1991, vol. 56(4): pp. 483-495.

* cited by examiner

UPDATING A MODEL OF A SUBTERRANEAN STRUCTURE USING DECOMPOSITION

CROSS REFERENCE TO RELATED APPLICATION

This claims the benefit under 35 U.S.C §119(e) of U.S. Provisional Application Ser. No. 61/011,607, filed Jan. 18, 2008, which is hereby incorporated by reference.

TECHNICAL FIELD

The invention relates to updating a model of a subterranean structure using decomposition.

BACKGROUND

Various techniques (e.g., electromagnetic or seismic techniques) exist to perform surveys of a subterranean structure for identifying subterranean bodies of interest. Examples of bodies of interest in the subterranean structure include hydrocarbon-bearing reservoirs, gas injection zones, thin carbonate or salt layers, and fresh-water aquifers. One type of electromagnetic (EM) survey technique is the controlled source electromagnetic (CSEM) survey technique, in which an electromagnetic transmitter, called a "source," is used to generate electromagnetic signals. Surveying units, called "receivers," are deployed on a surface (such as at the sea floor or on land) within an area of interest to make measurements from which information about the subterranean structure can be derived. The receivers may include a number of sensing elements for detecting any combination of electric fields, electric currents, and/or magnetic fields.

A seismic survey technique uses a seismic source, such as an air gun, a vibrator, or an explosive to generate seismic waves. The seismic waves are propagated into the subterranean structure, with a portion of the seismic waves reflected back to the surface (earth surface, sea floor, sea surface, or wellbore surface) for receipt by seismic receivers (e.g., geophones, hydrophones, etc.).

Measurement data (e.g., seismic measurement data or EM measurement data) is analyzed to develop a model of a subterranean structure. The model can include, as examples, a velocity profile (in which velocities at different points in the subterranean structure are derived), a density profile, an electrical conductivity profile, and so forth.

Conventionally, to update a model used in seismic or EM tomography of the subterranean structure, a linearized forward problem can be solved using a least squares technique, such as by using a least squares quadratic relaxation (LSQR) solver. However, should new information become available or if it becomes desirable to consider variations of prior information, then the least squares inversion would have to be repeated to update the model. Repeating the inversion is computationally very expensive.

SUMMARY

A method for updating a model of a subterranean structure is provided which includes computing a partial decomposition of an operator that is used to compute a parameterization representing the update of the model. The partial decomposition of the operator is selected from among a partial eigendecomposition of a Fisher information operator, and a singular value decomposition of the operator. A term based on additional information is combined with the partial decomposition of the operator to derive an update of the model.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, to update a model of a subterranean structure, an efficient technique is provided that derives a partial decomposition of an operator used to compute a parameterization representing the update of the model. As will be described further below, one example of the operator is a Fisher information operator. The partial decomposition of the Fisher information operator is a partial eigendecomposition of the Fisher information operator. Alternatively, the partial decomposition of the operator can be a partial singular value decomposition (SVD) of a tomographic operator. The partial decomposition of the operator can be combined with a term containing the "additional information" to derive an updated decomposition that can be used to update the model.

Eigendecomposition refers to the decomposition of a matrix into eigenvectors and eigenvalues. In the context of subterranean tomography, the eigenvectors and eigenvalues represent a "behavior" of an operator that can be used to update a model of the subterranean structure. For computational efficiency, the partial eigendecomposition can be reused multiple times with different additional information.

An SVD decomposition is a more general decomposition in that it can be applied to any rectangular m×n matrix, whereas an eigendecomposition can be applied to just certain classes of square matrices. An SVD decomposition of a matrix A produces eigenvalues and eigenvectors of $AA^T$ and $A^TA$.

In a first embodiment, the "additional information" is a prior covariance matrix that represents uncertainties of parameters of the model. In a second embodiment, the partial eigendecomposition is of the operator corresponding to a model for a first source of data, while the "additional information" includes information corresponding to a second source of data. For example, the first and second sources of data provide data of different types, such as (1) velocity data and density data, (2) velocity data and conductivity data, (3) density data and conductivity data, and (4) so forth.

In a third embodiment, the "additional information" is the information used to update the model in a null space of the operator.

In a fourth embodiment, a covariance matrix can be used for uncertainty analysis of a model.

In accordance with some embodiments, to solve a linearized forward problem of subterranean tomography (e.g., travel time tomography or common-image-point (CIP) tomography), multiple inversions do not have to be performed for the purpose of computing changes to the model in response to different "additional information." In some embodiments, the operator (e.g., a linear operator) used to compute the update of the model is a Fisher information operator. By using the eigendecomposition-based inversion approach according to some embodiments, additional information can be added to the solution of the linearized forward problem in an efficient manner.

The following linearized forward problem of subterranean tomography is considered:

$$\Delta y = A \Delta x + n, \quad (\text{Eq. 1})$$

where $\Delta y$ and $\Delta x$ are data and model perturbations (data changes and model changes), respectively, and n is the additive noise. In one exemplary implementation, A is a large sparse matrix obtained from the discretization of the Frechet derivatives of the non-linear operator which models the sensitivity of the picks to the velocity (and optionally to anisotropy parameters).

Preconditioned least squares is a common technique to solve Eq. 1, where the model is first preconditioned by $\Delta x = P \Delta x_p$, and $$\Delta y = A P \Delta x_p + n \quad (\text{Eq. 2})$$

is solved for $\Delta x_p$, which is conventionally computed using a regularized LSQR (least squares quadratic relaxation) solver. The LSQR solver provides a conventional least squares inversion technique to solve for changes in a model when additional information is considered. However, LSQR-based inversion techniques would involve repeated computations of inversions as different additional information is considered, which is computationally expensive.

In accordance with some embodiments, an eigendecomposition-based inversion technique is used to provide a flexible and efficient mechanism for addition of additional information to the solution of the subterranean tomography problem. In this regard, the following solution of Eq. 2 is considered in the absence of additional information about the model:

$$\Delta x_p = I_P^{-1} P^T A^T D^{-1} \Delta y, \quad (\text{Eq. 3})$$

where $D = E[nn^T]$ is the noise covariance, and $$I_P = P^T A^T D^{-1} A P \quad (\text{Eq 4})$$

is the Fisher information matrix corresponding to the precondition model parameterization $\Delta x_p$. The Fisher information matrix is a representation of a Fisher information operator that according to Eq. 3 is used to compute $\Delta x_p$. The pseudo-inverse of the Fisher information matrix is computed from the partial eigendecomposition, $I_P = U_{Ip} \Lambda_{Ip} U_{Ip}^T$, where $U_{Ip}$ is the orthogonal matrix formed by the eigenvectors, and $\Lambda_{Ip}$ is the diagonal matrix formed by the corresponding eigenvalues. Note that the eigendecomposition of $I_P$ above is a partial eigendecomposition, since the number of reconstructed eigen functions is less than the dimension of Fisher information matrix.

Alternatively, instead of using eigendecomposition of a Fisher information matrix, one can compute the singular value decomposition (SVD) of the tomographic operator $I^{1/2}{}_P = D^{-1/2} A P = Z \Lambda^{1/2}{}_{Ip} U_{Ip}^T$, where Z is a matrix of so-called left-hand side eigenvectors in the data space. The derivations in this description remain the same also for using SVD since they involve the same $\Lambda_{Ip}$ and $U_{Ip}^T$ as in eigendecomposition of the Fisher information operator. In the ensuing discussion, reference is made to performing partial decompositions of operators that involve partial eigendecompositions of Fisher information matrices—however, the techniques are also applicable to partial decompositions that are SVD decompositions of operators.

An efficient technique to compute eigendecomposition of large sparse symmetric matrices is a Lanczos iterations technique, which computes the eigendecomposition of the Fisher information matrix in two parts: (1) Lanczos iterations; and (2) computation of Ritz eigenvalues and eigenvectors. Note that in other implementations, other techniques can be used to compute eigendecompositions, such as an Arnoldi iteration technique.

The following sets forth a procedure for Lanczos iterations:
Initialization:
$v_1 \leftarrow$ random vector with norm 1
$v_0 \leftarrow 0$
$\beta_1 \leftarrow 0$
Iteration: for j=1 to m
$p_j \leftarrow P v_j$
$p_j \leftarrow A p_j$
$p_j \leftarrow D^{-1} p_j$
$p_j \leftarrow A^T p_j$
$p_j \leftarrow P^T p_j$
$w_j \leftarrow p_j - \beta_j v_{j-1}$
$\alpha_j \leftarrow (w_j, v_j)$
$\omega_j \leftarrow \omega_j - \alpha_j v_j$
$\beta_{j+1} \leftarrow (\omega_j, \omega_j)$
$v_{j+1} \leftarrow \omega_j / \beta_j + 1$
Return The Lanczos iterations are performed to understand the behavior of the Fisher information operator. Several parameters are initialized, including $v_1$, $v_0$, and $\beta_1$, and P, A, $D^{-1}$, $A^T$, and $P^T$ (which are known from Eq. 4) are used to update $p_j$. The outputs of the Lanczos iterations include $\alpha$, $\beta$, and v.

In the above, m iterations are performed (by stepping variable j from 1 to m). The outputs of the Lanczos iterations are used to compute eigenvalues and eigenvectors (e.g., Ritz eigenvalues and eigenvectors) as follows, by first computing a tridiagonal matrix $T_{mm}$:

$$T_{mm} = \begin{pmatrix} \alpha_1 & \beta_1 & 0 & 0 & \ldots & 0 & 0 \\ \beta_2 & \alpha_2 & \beta_3 & 0 & \ldots & 0 & 0 \\ 0 & \beta_3 & \alpha_3 & \beta_4 & \ldots & 0 & 0 \\ \vdots & \vdots & \vdots & \vdots & \vdots & \vdots & \vdots \\ 0 & 0 & 0 & 0 & \vdots & \alpha_{m-1} & \beta_m \\ 0 & 0 & 0 & 0 & \vdots & \beta_m & \alpha_m \end{pmatrix}$$

$$= Y_T^{(m)} \Lambda_r^{(y)} Y_T^{(m)T}$$

Using the $v_1, v_2, \ldots, v_m$ outputs from the Lanczos iterations, the matrix $V_m$ is computed:

$$V_m = (v_1, v_2, \ldots, v_m)$$

Ritz eigenvalues are eigenvalues of $T_{mm}$, and Ritz eigenvectors are computed by $$U_m = V_m Y_T^{(m)T}.$$

The matrix $T_{mm}$ is a tridiagonal matrix that contains the $\alpha$ and $\beta$ values output from the Lanczos iterations. The $Y_T$ matrix is the eigenvector. From the foregoing, the inverse of $I_p$ is obtained by $I_P^{-1} = U_{Ip} \Lambda_{Ip}^{-1} U_{Ip}^T$, where $U_{Ip} = U_m$ and $U_{Ip}^T = U_m^T$.

As noted above, the eigendecomposition of $I_p$ is a partial eigendecomposition because "additional information," in this case, a prior covariance matrix $C_0$, was not considered. When the prior covariance matrix $C_0 = E[\Delta x \Delta x^T]$ for $\Delta x$ is available (or otherwise a user desires to add $C_0$ to the solution), the least squares solution to Eq. 2 becomes:

$$\Delta x_p = C_p P^T A^T D^{-1} \Delta y \quad \text{(Eq. 5)}$$

$$\text{where } C_p = [I_p + PC_0^{-1}P^T]^{-1} \quad \text{(Eq. 6)}$$

is the posterior covariance matrix of $\Delta x_p$. $I_p + PC_0^{-1}P^T$ is considered to be an aggregation of the Fisher information matrix and a term containing the prior covariance matrix $C_0$.

Note that $C_0$ may have been previously available, or the user may have decided not to use $C_0$ in initially computing the partial eigendecomposition of $I_p$. For example there may be several possibilities for $C_0$, and the user may not initially be sure which of the possibilities for $C_0$ is accurate until later. Alternatively, the user may wish to apply some or all of the several possibilities for $C_0$ to the solution so that the effect of the different covariance matrices $C_0$ on $\Delta x_p$ can be observed. As yet another possibility, $C_0$ may not be known until some later time.

In any event, techniques according to some embodiments allow for computing the partial eigendecomposition of the Fisher information operator, with $C_0$ (and more specifically, $PC_0^{-1}P^T$) added to the solution to provide an updated eigendecomposition corresponding to an aggregation of the Fisher information matrix and a term containing the prior covariance matrix.

Since the partial eigendecomposition of the Fisher information matrix is computed in the absence of the prior covariance matrix $C_0$, the posterior covariance matrix Cp can be computed in three main steps:

1. Compute the eigendecomposition $C_0 = U_0 \Lambda_0 U_0^T$ of the prior covariance matrix (optional);
2. Compute the eigendecomposition of the inverse of the posterior covariance matrix; and
3. Compute the eigendecomposition of the posterior covariance matrix.

The first step is performed efficiently by using a Lanczos iterations technique similar to that described above for the Fisher information matrix $I_p$. From the eigendecomposition of $C_0$, $C_0^{-1}$ can be readily derived, similar to derivation of $I_p^{-1}$ using the eigendecomposition of $I_p$ above. Note that step 1 is an optional step. The eigendecomposition of $C_0$ does not have to be computed if $C_0$ is relatively simple and thus $C_0^{-1}$ (the inverse of $C_0$) can be easily calculated. The eigendecomposition of $C_0$ is performed for the purpose of calculating $C_0^{-1}$ if $C_0$ is relatively complex.

The third step (step 3) is relatively trivial as a consequence of the eigendecomposition obtained in the second step (step 2).

In the depicted example, the second step is done by using a modified form of the Lanczos iterations technique once the eigendecompositions of the Fisher information matrix $I_p$ and prior covariance matrix $C_0$ are calculated. This example assumes that the eigendecomposition of $C_0$ has been computed. Computational efficiency is enhanced since the Lanczos iterations technique is one of the algorithms that deal almost only with matrix multiplications and inner products. The iterations of the Lanczos iterations technique is tailored to take advantage of the eigendecompositions of the Fisher information and prior covariance matrices as follows:

Initialization:
$v_1 \leftarrow$ random vector with norm 1
$v_0 \leftarrow 0$
$\beta_1 \leftarrow 0$
Iteration: for j=1 to m
$u_j \leftarrow U_{Ip}^T v_j$
$u_j \leftarrow \Lambda_{Ip}^T u_j$
$u_j \leftarrow U_{Ip} u_j$
$p_j \leftarrow P^T v_j$
$p_j \leftarrow U_0^T p_j$
$p_j \leftarrow \Lambda_0 P_j$
$p_j \leftarrow U_0 p_j$
$p_j \leftarrow P p_j$
$\omega_j \leftarrow p_j + u_j - \beta_j v_{j-1}$
$\alpha_j \leftarrow (\omega_j, v_j)$
$\omega_j \leftarrow \omega_j - \alpha_j v_j$
$\beta_{j+1} \leftarrow (\omega_j, \omega_j)$
$v_{j+1} \leftarrow \omega_j / \beta_{j+1}$
Return In the above, m iterations are performed. Note that in each iteration, $U_{Ip}^T$, $\Lambda_{Ip}^T$, $U_{Ip}$ are known as are $U_0$, $\Lambda_0$, and $U_0^T$ (computed in step 1 above in the eigendecomposition of the prior covariance matrix $C_0$). The Lanczos iterations are followed by the computation of the Ritz eigenvalues and eigenvectors as discussed above so that $[I_p + PC_0^{-1}P^T]$ can be calculated. Following computation of $[I_p + PC_0^{-1}P^T]$, $[I_p + PC_0^{-1}P^T]^{-1}$ can be computed relatively trivially (in step 3) so that Eq. 5 can be solved to find $\Delta x_p$.

The above modified form of the Lanczos iterations technique is suitable for implementation in a parallel computer system that has plural processing nodes, which makes the incorporation of prior information ($C_0$) to the operator (Fisher information operator) computationally efficient.

In some embodiments, the form for P is the one that is roughly consistent with the shape of Fresnel volumes corresponding to the finite-frequency-band nature of wave propagation. P can be interpreted as the operator A (obtained by ray tracing) being smoothed by P in a way approximating an operator for "fat" rays or wavepaths. Thus, the solution $\Delta x_p$ is sought in the space of the smoothed operator. The procedure guarantees the smoothness of $\Delta x_p$ since it is obtained from the eigenspace of the smoothed normal operator, in contrast to LSQR which can provide relatively rough $\Delta x_p$ and requires extra smoothing with P to get $\Delta x$ as the final answer.

In the case of anisotropic velocity model building, the form for P is P=FW. An anisotropic velocity model refers to a model where velocities can vary as a function of direction. Here F is taken to be a block diagonal smoothing operator where each block corresponds to a smoothing operator for a certain anisotropy parameter; and W is a block diagonal weighting matrix whose blocks are of same size of F and include scalar diagonal matrices corresponding to relative normalization for the aforementioned anisotropy parameters. The model perturbation presented in Eq. 5 is modified as follows:

$$\Delta x_w = W C_p P^T A^T D^{-1} \Delta y. \quad \text{(Eq. 7)}$$

The block diagonal weighting matrix W is used to relatively weight blocks for the different types of parameters in order to get them approximately to the same dynamic range. For example, a first type of parameter can represent vertical velocity, while a second type of parameter represents a ratio between the vertical velocity and horizontal velocity (or alternatively Thomsen anisotropic parameters). Since the units of measurement for these two types of parameters are different, the block diagonal weighting matrix W can define weights to account for such different units of measurement.

Figure 1:
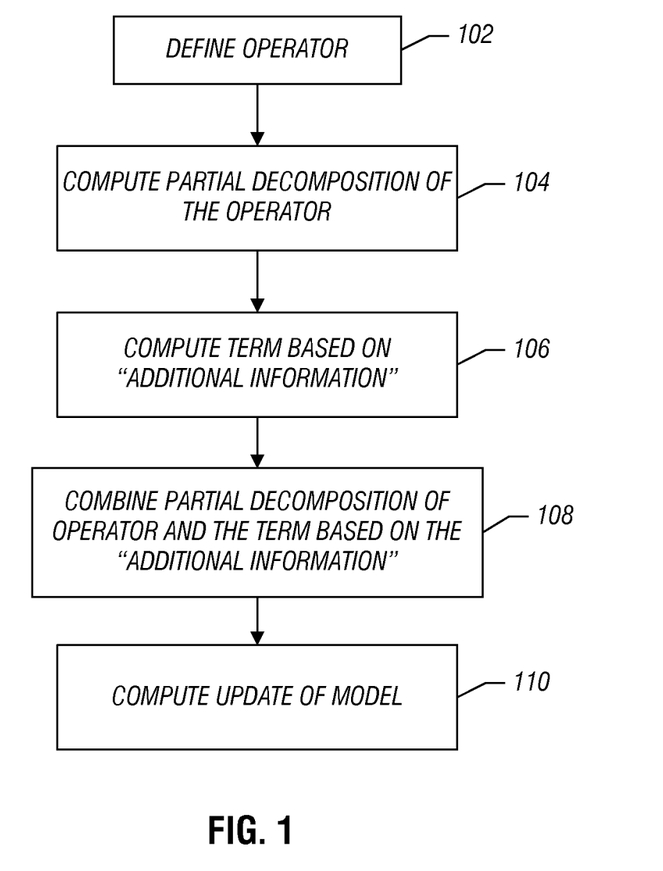
FIG. 1 is a flow diagram of a process according to an embodiment.

FIG. 1 illustrates a general flow of updating a model according to an embodiment. An operator (such as a Fisher information operator or another type of tomographic operator such as one used for SVD decomposition) is initially defined (at 102). A representation of the Fisher information operator is the Fisher information matrix $I_p$. A representation of the tomographic operator for SVD decomposition is $I^{1/2}_p$. As discussed above, the Fisher information matrix is defined by data structures (see Eq. 4) containing values derived from survey data collected using active survey sources, such as active seismic sources (e.g., air guns, vibrators, explosives, etc.), an active electromagnetic (EM) source, ground penetrating radar, and so forth.

Next, a partial decomposition of the operator is computed (at 104), where the partial decomposition is performed without using "additional information" (e.g., covariance matrix $C_0$) that is either not available or that the user does not wish to use yet. The partial decomposition can be a partial decomposition of the Fisher information matrix, or alternatively, a partial SVD decomposition of a tomographic operator.

Subsequently, to apply the "additional information" when it becomes available or the user wishes to apply the "additional information," a term based on the "additional information" (e.g., covariance matrix $C_0$) is computed (at 106). This "term" can be $PC_0^{-1}P^T$ as discussed above. Alternatively, this "term" can be the eigendecomposition of $C_0$. As noted above, in some embodiments, $C_0^{-1}$ can be computed by calculating the eigendecomposition of $C_0 : U_0 \Lambda_0 U_0^T$.

Next, the partial decomposition of the operator and the term based on the "additional information" are combined (at 108), which corresponds to steps 2 and 3 above for computing the posterior covariance matrix $C_P$. The combination produces an updated decomposition that can be used for computing (at 110) the update of the model, which according to Eq. 5 is $\Delta x_p$.

The foregoing refers to the first embodiment, which computes the update of the model due to application of the prior covariance matrix $C_0$ to the solution of the linearized forward problem of subterranean tomography.

The following refers to a second embodiment, in which eigendecomposition of linear operators corresponding to different data sources are combined.

In the second embodiment, instead of being a prior covariance matrix $C_0$, the "additional information" is information from a different data source pertaining to the tomography model. Multiple decompositions of Fisher information operators can be calculated and combined. For example, the eigendecompositions of two Fisher information matrices corresponding to two different sources of information can be combined. One source of information includes velocity data, while another source of information includes gravity data. In yet other implementations, different sources of data correspond to data collected based on an EM survey, a survey using ground penetrating radar, and so forth. Note that the different data sources can also provide the same type of survey data. Instead of performing eigendecompositions of Fisher information matrices, an alternative embodiment can compute SVD decompositions of tomographic operators corresponding to the different data sources.

In the ensuing discussion, reference is made to velocity data from a first source and density data from a second source. However, the same technique can be applied to other types of survey data (e.g., EM data, data responsive to ground penetrating radar, etc.).

Let v and ρ be the velocity and density in each volume (representing the subterranean structure) and b denote the boundary of the volumes. The data obtained from seismic and gravity satisfy:

$$d_s = [\, S_v \quad S_b \,] \begin{bmatrix} v \\ b \end{bmatrix}, \quad \text{(Eq. 8)}$$

and $$d_g = [\, G_b \quad G_\rho \,] \begin{bmatrix} b \\ \rho \end{bmatrix}, \quad \text{(Eq. 9)}$$

respectively, where $S_v$, $S_b$, $G_b$, and $G_\rho$ are matrices representing velocity and gravity data, respectively. Define models $m_s$ and $m_g$ by:

$$\begin{bmatrix} v \\ b \end{bmatrix} = m_s, \quad \begin{bmatrix} b \\ \rho \end{bmatrix} = m_g.$$

According to Eq. 5 above for the first embodiment, the solution for Eqs. 8 and 9 can be written as:

$$\hat{m}_s = I_s^{-1} \begin{bmatrix} S_v^T \\ S_b^T \end{bmatrix} d_s, \quad \text{(Eq. 10)}$$

and $$\hat{m}_g = I_g^{-1} \begin{bmatrix} G_b^T \\ G_\rho^T \end{bmatrix} d_g. \quad \text{(Eq. 11)}$$

Here $I_s$ and $I_g$ are the Fisher information matrices corresponding to velocity and gravity data, respectively, $$I_s = \begin{bmatrix} S_v^T S_v & S_v^T S_b \\ S_b^T S_v & S_b^T S_b \end{bmatrix} \text{ and } I_g = \begin{bmatrix} S_b^T S_b & S_b^T S_\rho \\ S_\rho^T S_b & S_\rho^T S_\rho \end{bmatrix}. \quad \text{(Eq. 12)}$$

In the first embodiment discussed above, the inversion was presented for perturbations of a given model; in contrast, here the models themselves are considered. However, the mechanics of the computations remain the same.

As long as two models agree on the boundary, seismic and gravity measurements can be jointly written as:

$$\begin{bmatrix} d_s \\ d_g \end{bmatrix} = \begin{bmatrix} S_v & S_b & 0 \\ 0 & G_b & G_\rho \end{bmatrix} \begin{bmatrix} v \\ b \\ \rho \end{bmatrix}. \quad \text{(Eq. 13)}$$

Define $$m_{gs} = \begin{bmatrix} v \\ b \\ \rho \end{bmatrix}.$$

Then the solution to the joint problem of Eq. 13 is computed by:

$$\hat{m}_{gs} = I_{gs}^{-1} \begin{bmatrix} S_v^T & 0 \\ S_b^T & G_b^T \\ 0 & G_\rho^T \end{bmatrix} \begin{bmatrix} d_s \\ d_g \end{bmatrix} \quad \text{(Eq. 14)}$$

$$= I_{gs}^{-1} \left[ \begin{bmatrix} I_s \hat{m}_s \\ 0 \end{bmatrix} + \begin{bmatrix} 0 \\ I_g \hat{m}_g \end{bmatrix} \right],$$

where $$I_{gs} = \begin{bmatrix} I_s & \\ & 0 \end{bmatrix} + \begin{bmatrix} 0 & \\ & I_g \end{bmatrix} \quad \text{(Eq. 15)}$$

is the Fisher information matrix for the joint problem. Assuming that $\hat{m}_s$, $\hat{m}_g$ and eigendecomposition of $I_s$, $I_g$ are known a priori, the joint seismic-gravity inversion is obtained in three steps:

1. Perform modified Lanczos iterations discussed for the first embodiment on the eigendecomposition of $I_s$ and $I_g$, followed by the computation of Ritz eigenvalues and eigenvectors of $I_{gs}$;
2. Compute the inverse $I_{gs}^{-1}$ of $I_{g3}$;
3. Compute $$I_{gs}^{-1} \begin{bmatrix} I_s \hat{m}_s \\ 0 \end{bmatrix}, I_{gs}^{-1} \begin{bmatrix} 0 \\ I_g \hat{m}_g \end{bmatrix}$$

and sum the results.

In the foregoing, an eigendecomposition of the Fisher information operator for seismic data (from a first data source) is computed, and an eigendecomposition of the Fisher information operator for gravity data (from a second data source) is computed. The eigendecompositions of the Fisher information operator from the different sources are combined to provide a combined (updated) eigendecomposition for $I_{gs}$. From the combined eigendecomposition, $I_{gs}^{-1}$ can be calculated, and the updated model (that takes into account data from both data sources) can be calculated. For this second embodiment, the "partial eigendecomposition" referred to in the flow of FIG. 1 is the eigendecomposition of the Fisher information operator for data from the first source, and the "additional information" is the data from the second source. In FIG. 1, the "term based on the additional information" is the eigendecomposition of the Fisher information operator corresponding to data from the second source.

For the second embodiment, the combined model (that takes into account data from multiple sources) can also further be updated using a prior mean and covariance matrix of velocity and density, similar to the first embodiment described above. In the presence of a prior mean and covariance matrix of velocity and density, $$m_0 = \begin{bmatrix} v_0 \\ 0 \\ \rho_0 \end{bmatrix} \text{ and } C_0^{-1} = \begin{bmatrix} C_{0vv}^{-1} & & C_{0v\rho}^{-1} \\ & 0 & \\ C_{0\rho v}^{-1} & & C_{0\rho\rho}^{-1} \end{bmatrix}$$

respectively, the inversion formula (Eq. 14) becomes:

$$m_{gs0} = I_{gs0}^{-1} \left[ \begin{bmatrix} I_s \hat{m}_s \\ 0 \end{bmatrix} + \begin{bmatrix} 0 \\ I_g \hat{m}_g \end{bmatrix} + C_0^{-1} m_0 \right], \quad \text{(Eq. 16)}$$

where $I_{gs0} = I_{gs} + C_0^{-1}$. The inverse of $I_{g30}$ is computed using the eigendecompositions of $I_{gs}$ and $C_0$ using the Lanczos iteration technique of the first embodiment.

A third embodiment deals with updating the model perturbations in the null-space of the Fisher information matrix presented in the first embodiment. For example, a velocity model update in CIP tomography can be performed after obtaining additional information about anisotropy parameters, which may be obtained from well data. Note that the Fisher information matrix can be a sparse matrix that has regions with null data (i.e., no data or invalid data). This third embodiment is related to updating some of these null regions of the Fisher information matrix with new data as the new data becomes available.

The update is computed by first projecting the additional information onto the orthogonal complement of the space spanned by the Ritz eigenvectors of the Fisher information matrix, and then adding this projection to the original model perturbation. The update does not alter the original model perturbation within the space spanned by the Ritz eigenvector; as a result, the updated model perturbation is consistent with the original one within this space.

Let $\Delta x_0$ be the desired update which may come from new well information or from a geological expert. Define $\Delta x_w = W^{-1} \Delta x_0$ as the re-weighted desired update. Then a null-space projected update $\Delta x_w$ is defined as the W weighted projection of $\Delta x_w$ onto the null space of the Ritz eigenvectors (the complement of the space spanned by the Ritz eigenvectors) of the Fisher information matrix corresponding to the original model perturbation $\Delta x$:

$$\Delta x_N = W \left[ \Delta x_w - \sum_i (\Delta x_w, Y_i) Y_i \right], \quad \text{(Eq. 17)}$$

where $Y_i = (Y_1, Y_2, \ldots Y_m)$ are the Ritz eigenvectors obtained in the first embodiment. This embodiment could be considered as a quick-and-dirty version of the second or third embodiment, i.e., the eigen informative space is not updated. This embodiment could be more preferable when the prior covariance matrix or the data covariances for various datasets are poorly known. Preferably, the spatial scale length of the desired update should be less than the scale length used in P corresponding to the Fresnel volumes as used in the first embodiment (for example, in adding faults to the velocity model).

According to a fourth embodiment, as mentioned above, a covariance matrix (such as a posterior covariance matrix as computed above) can be used for uncertainty analysis of a model. This analysis can include the visualization and comparison of different parts of the covariance matrix, like its diagonal, rows, and quadratic forms (in case of anisotropy). Similarly, resolution matrix corresponding to calculated covariance matrix is analyzed. The analysis can be performed for comparing various prior assumptions while varying a prior covariance matrix and for comparing different acquisition geometries. To perform structural uncertainty analysis, a linear operator is obtained that maps the variations in velocity and the anisotropic parameters $\epsilon$ and $\delta$ to variation of reflector location along the normal direction to the reflector, such as according to a technique described in C. Stork et al., "Linear Aspects of tomographic velocity analysis," Geophysics, Vol. 56, pp. 483-495 (1991), or in Marta Jo Woodward et al., "A Decade of Tomography," Vol. 73, pp. VE5-VE11 (2008). This linear operator is referred to as F.

Using the linear operator F, the posterior covariance matrix for velocity and anisotropic parameters is mapped onto the structural covariance matrix for reflector location along the normal direction to the reflector by $Cs = F^T CF$, where C represents the posterior covariance matrix. Thus, the uncertainty in depth is calculated using the correlated uncertainties in velocity and anisotropic parameters along the corresponding rays for each CIP point.

Figure 2:
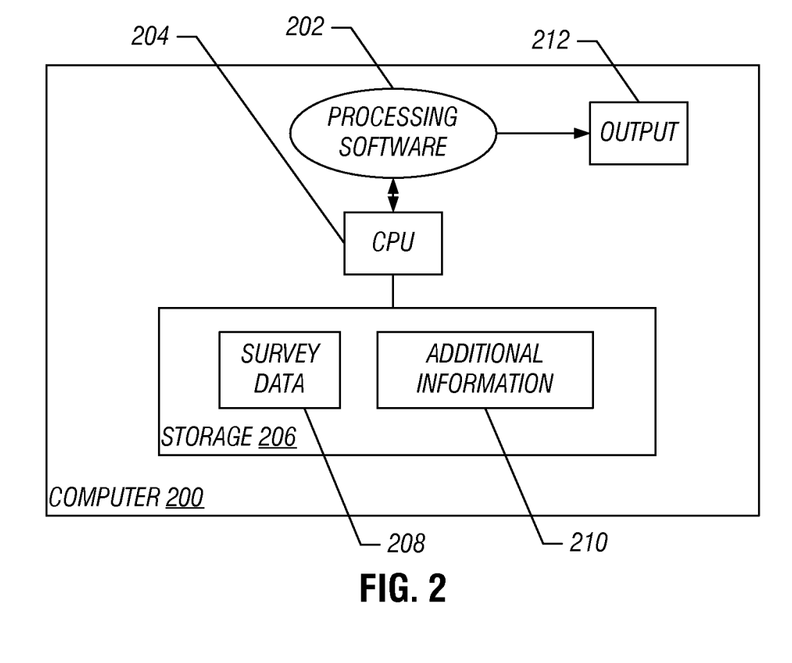
FIG. 2 is a block diagram of an example computer in which an embodiment of the invention can be incorporated.

FIG. 2 is a block diagram of an example computer 200 in which processing software 202 according to some embodiments is executable. The processing software 202 is able to perform any of the tasks for any of the first, second, and third embodiments described above. The processing software 202 is executable on one or more central processing units (CPUs) 204, which is connected to a storage 206. The storage 206 can store various data, including survey data (e.g., seismic data, EM data, etc.). The storage 206 can also store "additional information" 210 that is used for updating a solution to the tomography problem.

The processing software 202 produces an output 212 as a result of its execution. The output 212 is either displayed in a display device of the computer 200, or alternatively, the output 212 can be communicated over a data network to a remote computer for display on the remote computer. The output 212 can be the updated model.

Instructions of the processing software 202 are loaded for execution on a processor (such as the one or more CPUs 204). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method, executed by a computer, of updating a model of a subterranean structure, comprising:
   computing a partial decomposition of an operator that is used to compute a parameterization representing an update of the model, wherein the partial decomposition of the operator is selected from the group consisting of a partial singular value decomposition of the operator, and a partial eigendecomposition of a Fisher information operator;
   combining a term based on additional information with the partial decomposition of the operator to derive the update of the model.

2. The method of claim 1, wherein the term based on the additional information comprises an eigendecomposition of the additional information, and wherein combining the term with the partial decomposition comprises combining the eigendecomposition of the additional information with the partial decomposition of the operator.

3. The method of claim 2, wherein the eigendecomposition of the additional information is an eigendecomposition of a prior covariance matrix that represents uncertainties regarding parameters of the model.

4. The method of claim 3, further comprising deriving an eigendecomposition of a posterior covariance matrix that is defined in part by the operator and the prior covariance matrix.

5. The method of claim 4, further comprising using the posterior covariance matrix to perform uncertainty analysis of the updated model.

6. The method of claim 2, further comprising computing the eigendecomposition of the additional information using a Lanczos iterations technique.

7. The method of claim 1, wherein computing the partial decomposition and combining the term based on the additional information with the partial decomposition of the operator are executed in a parallel computer system having a plurality of processing nodes.

8. The method of claim 1, wherein computing the partial eigendecomposition of the Fisher information operator uses a Lanczos iterations technique.

9. The method of claim 1, wherein the partial decomposition is a first eigendecomposition of a first operator corresponding to first survey data, and the additional information comprises second survey data, and wherein the term based on the second survey data comprises a second eigendecomposition of a second operator corresponding to the second survey data,
   wherein the combining comprises combining the first and second eigendecompositions.

10. The method of claim 9, wherein the first and second survey data are different types of survey data.

11. The method of claim 9, wherein the first and second survey data are the same type of survey data.

12. A method, executed by a computer, of updating a model of a subterranean structure, comprising:
   computing a partial decomposition of an operator that is used to compute a parameterization representing an update of the model, wherein the partial decomposition of the operator is selected from the group consisting of a partial singular value decomposition of the operator, and a partial eigendecomposition of a Fisher information operator; and
   updating the model in a null space of the operator with additional information.

13. An article comprising at least one computer-readable storage medium containing instructions that when executed cause a computer to:
   compute a first eigendecomposition of an operator that is used to compute a parameterization representing an update of a model of a subterranean structure;
   compute a second eigendecomposition of additional information;
   combining the first and second eigendecompositions to derive an updated eigendecomposition; and
   using the updated eigendecomposition to compute an update of the model.

14. The article of claim 13, wherein the operator comprises a Fisher information operator.

15. The article of claim 14, wherein the additional information comprises a prior covariance matrix.

16. The article of claim 13, wherein the first eigendecomposition of the operator corresponds to first survey data, and wherein computing the second eigendecomposition comprises computing the second eigendecomposition of another operator for second survey data.

17. The article of claim 13, wherein the second eigendecomposition of the additional information is an eigendecomposition of a prior covariance matrix that represents uncertainties regarding parameters of the model.

18. The article of claim 17, wherein deriving the updated eigendecomposition comprises deriving the eigendecomposition of a posterior covariance matrix that is defined in part by the operator and the prior covariance matrix.

19. The method of claim 18, wherein the instructions when executed cause the computer to further use the posterior covariance matrix to perform uncertainty analysis of the updated model.

20. A computer comprising:
a storage to store survey data;
a processor to:
compute a partial decomposition of an operator that is used to compute a parameterization representing an update of a model derived from the survey data, wherein the partial decomposition of the operator is selected from the group consisting of a partial singular value decomposition of the operator, and a partial eigendecomposition of a Fisher information operator;
combine a term based on additional information with the partial decomposition of the operator to derive an update of the model.

21. The computer of claim 20, wherein the term based on the additional information is an eigendecomposition of a prior covariance matrix that represents uncertainties regarding parameters of the model.

22. The computer of claim 20, the processor to further derive the eigendecomposition of a posterior covariance matrix that is defined in part by the operator and the prior covariance matrix.

* * * * *